UNITED STATES PATENT OFFICE.

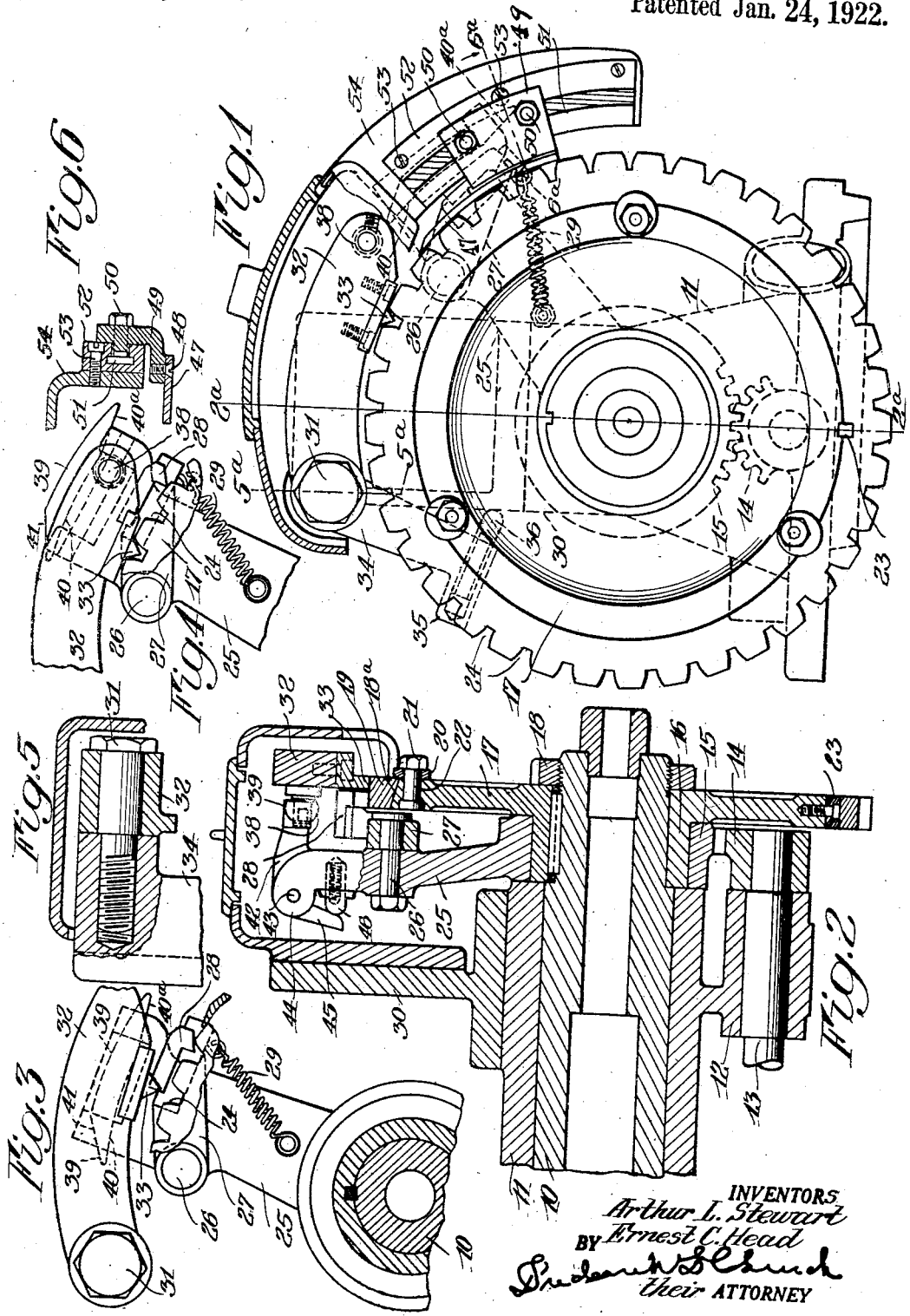

ARTHUR L. STEWART AND ERNEST C. HEAD, OF ROCHESTER, NEW YORK, ASSIGNORS TO GLEASON WORKS, OF ROCHESTER, NEW YORK, A CORPORATION OF NEW YORK.

INDEXING MECHANISM.

1,404,243.  Specification of Letters Patent.  Patented Jan. 24, 1922.

Application filed June 7, 1920. Serial No. 387,122.

*To all whom it may concern:*

Be it known that we, ARTHUR L. STEWART and ERNEST C. HEAD, citizens of the United States, residing at Rochester, in the county of Monroe and State of New York, have invented certain new and useful Improvements in Indexing Mechanisms; and we do hereby declare the following to be a full, clear, and exact description of the same, reference being had to the accompanying drawings, forming a part of this specification, and to the reference-numerals marked thereon.

This invention relates to indexing mechanism, and, more particularly, to mechanism of this character adapted to be employed with gear cutting machines. The chief object of the invention is to provide a mechanism of this variety which is simple and durable in construction, readily adjustable to afford a wide range of indexing action, and positive and reliable in operation. To these and other ends, the invention resides in certain improvements and combinations of parts all as will be hereinafter more fully explained, the novel features being pointed out in the claims at the end of the specification.

In the drawings:

Figure 1 is an elevation with parts in section of an indexing mechanism embodying the present invention.

Figure 2 is a sectional view of the same on the line $2^a$—$2^a$ of Figure 1.

Figure 3 is a fragmentary detailed view showing the actuating pawl and locking dog for the index wheel.

Figure 4 is a view similar to Figure 3 showing the parts in a different position.

Figure 5 is a fragmentary sectional view on line $5^a$—$5^a$ of Figure 1.

Figure 6 is a fragmentary sectional view on the line $6^a$—$6^a$ of Figure 1.

Similar reference characters throughout the several views indicate the same parts.

The present invention comprises an indexing mechanism of general utility and particularly adapted for use in gear cutting and similar machines, for intermittently rotating the gear blank, for example, through a small angle upon completion of a tooth interval to bring a new portion of the blank to position to be cut by the tools. The embodiment of the invention at present preferred as best illustrating the principles involved is shown as employed in conjunction with a work support or blank spindle 10 which in this case is rotatably carried in a bearing 11 supported by the main frame of the machine. Formed on this bearing preferably is an auxiliary bearing 12 in which rotates a shaft 13 having fixed on its outer end a gear sector 14 meshing with gear teeth formed on a hub 15 rotatably carried on the hub 16 of a disc 17 which is keyed on the spindle and secured in place by a nut 18. The latter has a beveled periphery $18^a$ on which is detachably supported the index wheel proper in the form of an annular ring 19 having a correspondingly beveled inner surface seating on the surface 18 of disc 17 and secured thereon by washers 20 supported by nuts 21 on bolts 22 carried in disc 17. A key 23 is provided for preventing rotation of the index wheel on its supporting disc. The index wheel is provided with peripherally spaced indexing points or notches 24 and is detachably supported in the manner described to facilitate the substitution of wheels having a greater or less number of notches as the work may require.

Gear hub 15 carries an upwardly extending arm 25 in which is fixed a short spindle 26 rotatably supporting an arm 27 carrying a pawl 28 adapted when moved in a counter clockwise direction to engage the notches 24 of the index wheel to rotate the latter and the blank spindle, but when rotated in the opposite direction to ride idly over the index wheel. A spring 29 secured to arms 25 and 27 maintains the pawl in contact with the wheel.

Supported on an upstanding portion 30 of the main frame is a spindle 31 rotatably carrying an arm 32 provided with a locking dog or spur 33 adapted for engagement with the notches of the index wheel to lock the latter in fixed position between indexing operations and during the cutting action on the blank. Arm 32 has a downward extension 34 provided with a head 35 having a socket in which is carried a spring pressed plunger 36 arranged to bear against portion 30 of the frame and thus to urge locking dog 33 into contact with the index wheel. Arm 32 carries on its rear side a roller 38 adapted to be engaged by a cam or shuttle 39 movably carried on the upper end of oscillating arm 25. This shuttle has an under surface 40 curving upwardly at one end 40ª and has on the upper side of the opposite end an inclined surface 41 adapted during movement of arm 25 and shuttle 39 in a counter clockwise direction to engage under roller 38 and lift arm 32 and its locking dog 33 out of engagement with the index wheel to permit the latter to be rotated by pawl 28. During movement of the shuttle in the opposite direction, however, its under surface 40 rides over roller 38 leaving the locking tooth in engagement with the index wheel. To permit this movement of the shuttle over the roller the shuttle is yieldably carried by an arm 42 pivotally supported at 43 on an upwardly extending lug 44 on arm 25. Arm 42 is provided with a tail portion 45 bearing against a plunger 46 spring actuated and supported on arm 25 for normally holding the shuttle in lower position.

A means is provided for adjustably varying the arc of contact of pawl 28 with the index wheel, comprising a guide plate 47 curved to conform with the periphery of the index wheel and supported by means of screws 48 on a bracket 49 adjustably secured by means of bolts 50 engaging in an arcuate T slot 51 in a plate 52 secured by means of screws 53 on a portion 54 of a housing for the mechanism carried by the main frame. Slot 51 extends circumferentially of the center of the work support or spindle 10. It is apparent that guide plate 47 may be rotatably adjusted to various positions by the adjustment of bolts 50 in slot 51 so that pawl 28 during its clockwise or idle movement rides up on the guide and is thus moved out of contact with the index wheel. On its return or active stroke the pawl engages with one another of the notches of the wheel, depending upon the position of the guide plate, so that the pawl may be caused to rotate the wheel through the space of one or more notches depending upon the adjustment of the guide.

In operation an index wheel is selected having a number of teeth or notches which is any multiple of the number of teeth in the particular gear to be cut, and the pawl guide is adjusted in the manner described for controlling the pawl, so that the latter at each active stroke moves the index wheel through one or more notches. One index wheel therefore can be used to cut gears having widely varying numbers of teeth; for instance, with a 60 tooth index wheel a gear having 60 teeth can be cut by adjusting the pawl guide so that the pawl turns the index wheel through the angle of one tooth at each stroke, and likewise 30 teeth can be cut with the same index wheel by adjusting the pawl guide to move the latter two notches, 20 teeth can be cut by moving the wheel 3 notches, 15 teeth can be cut by moving the wheel 4 notches and 12 teeth can be cut by moving the wheel 5 notches, as is evident. Shaft 13 is intermittently oscillated by any well known or suitable means connected with the operating mechanism of the machine so that upon completion of each tooth, arm 25 is oscillated, moving pawl 28 in a clockwise direction during which time the locking dog holds the index wheel and the gear blank securely locked against rotation. As the pawl moves in the opposite direction, however, shuttle 39 engaging roller 38, lifts the locking dog to free the index wheel so that when the pawl drops off the adjustable guide 47 it engages and rotates the index wheel to index the work, at the completion of which movement roller 38 drops off the end of shuttle 39 and again locks the index wheel.

The construction is simple in character, comprising comparatively few parts which are strong and durable in form. The few adjustments required, such as the substitution of one index wheel for another and the position of the pawl guide, are readily made and provide for a wide range in the dimensions of the work to be handled, while the various parts are so designed as to be positive and reliable in operation.

We claim as our invention:

1. In an indexing mechanism, the combination of a rotatable work spindle having an index wheel fixed thereon, a hub oscillating concentrically with said spindle and provided with gear means for oscillating the same, a pivotally supported dog for locking said wheel, spring means tending to move said dog into engagement with said wheel, an arm on said hub having a pawl for engaging and rotating said wheel and also a part for moving the dog to unlock the wheel, and a device for varying the extent of movement of the wheel by said pawl at each oscillation thereof.

2. In an indexing mechanism, the combination of stationary supporting means, a work spindle rotatably supported thereby and having an index wheel fixed thereon, a hub oscillating about the axis of said spindle, gear means for oscillating said hub, a spring actuated dog for locking the index wheel pivotally mounted on said supporting means, an arm on said hub, a pawl pivotally supported on said arm for engaging and rotating said wheel, a part on said arm for moving said dog to unlock the wheel, and a part adjustably carried by said supporting means for varying the extent of movement of the wheel by the pawl at each oscillation thereof.

3. In an indexing mechanism, the combination of a rotatable work spindle having an index wheel fixed thereon, a hub oscillating concentrically with said spindle and provided with gear means for oscillating the same, a pivotally supported dog for locking said wheel, spring means tending to move said dog into engagement with said wheel, an arm on said hub having a pawl for engaging and rotating said wheel, a spring actuated cam movable on said arm toward and from position for moving said dog to unlock said wheel, and a device for varying the extent of movement of the wheel by the pawl at each oscillation thereof.

4. In an indexing mechanism, the combination of stationary supporting means, a work spindle rotatably supported thereby and having an index wheel fixed thereon, a hub oscillating about the axis of said spindle, gear means for oscillating said hub, a spring actuated dog, for locking the index wheel pivotally mounted on said supporting means, an arm on said hub, a pawl pivotally supported on said arm for engaging and rotating said wheel, a spring actuated cam movable on said arm toward and from position for lifting said dog to unlock said wheel, and an arc-shaped part adjustably carried by said supporting means adjacent the periphery of said wheel for varying the extent of movement of the wheel by the pawl at each oscillation of the latter.

ARTHUR L. STEWART.
ERNEST C. HEAD.